United States Patent [19]

Ives

[11] Patent Number: 5,149,372
[45] Date of Patent: Sep. 22, 1992

[54] MULTIPLE ROLL IMPREGNATOR

[75] Inventor: Frank E. Ives, Kent, Wash.

[73] Assignee: PMC, Inc, Sun Valley, Calif.

[21] Appl. No.: 485,441

[22] Filed: Feb. 27, 1990

[51] Int. Cl.$^5$ ............................................. B05C 3/02
[52] U.S. Cl. .................................. 118/412; 118/407; 118/714; 118/419; 68/22 B
[58] Field of Search ............... 118/249, 407, 419, 414, 118/118, 117, 412; 427/430.1, 434.2, 359; 68/22 B, 22 R

[56] References Cited

U.S. PATENT DOCUMENTS

| | | | |
|---|---|---|---|
| 2,009,631 | 7/1935 | Montgomery | 118/414 |
| 2,015,531 | 7/1932 | Montgomery . | |
| 2,089,524 | 8/1937 | Abrams et al. | 118/414 |
| 2,257,113 | 2/1939 | George . | |
| 2,511,625 | 6/1950 | Dungler | 66/22 B |
| 2,603,077 | 7/1952 | Dungler | 68/22 B |
| 2,618,575 | 10/1949 | Oswin . | |
| 2,623,377 | 12/1952 | Dungler | 68/22 B |
| 2,961,336 | 11/1960 | Uhleen | 118/118 |
| 3,234,041 | 1/1960 | Rosecrans . | |
| 3,238,058 | 3/1966 | Jeannin | 118/419 |
| 3,958,432 | 5/1976 | Gronoff | 68/22 R |
| 3,972,209 | 8/1976 | Serkov | 68/22 R |
| 4,193,762 | 3/1980 | Namboodri | 68/175 |
| 4,294,872 | 10/1981 | Kullander | 427/358 |

FOREIGN PATENT DOCUMENTS

| | | | |
|---|---|---|---|
| 28136 | 4/1964 | Fed. Rep. of Germany | 118/407 |
| 2906109 | 1/1980 | Fed. Rep. of Germany | 118/407 |
| 919584 | 2/1963 | United Kingdom | 118/407 |

Primary Examiner—W. Gary Jones
Assistant Examiner—Brenda Lamb
Attorney, Agent, or Firm—Christensen, O'Connor, Johnson & Kindness

[57] ABSTRACT

A six-roll impregnator applies resin to only one side of a fabric. The resin is then pressed through the fabric, after which a pair of rolls squeezes excess resin from the fabric. In this manner, no air is entrapped within the fabric during the impregnation process.

5 Claims, 6 Drawing Sheets

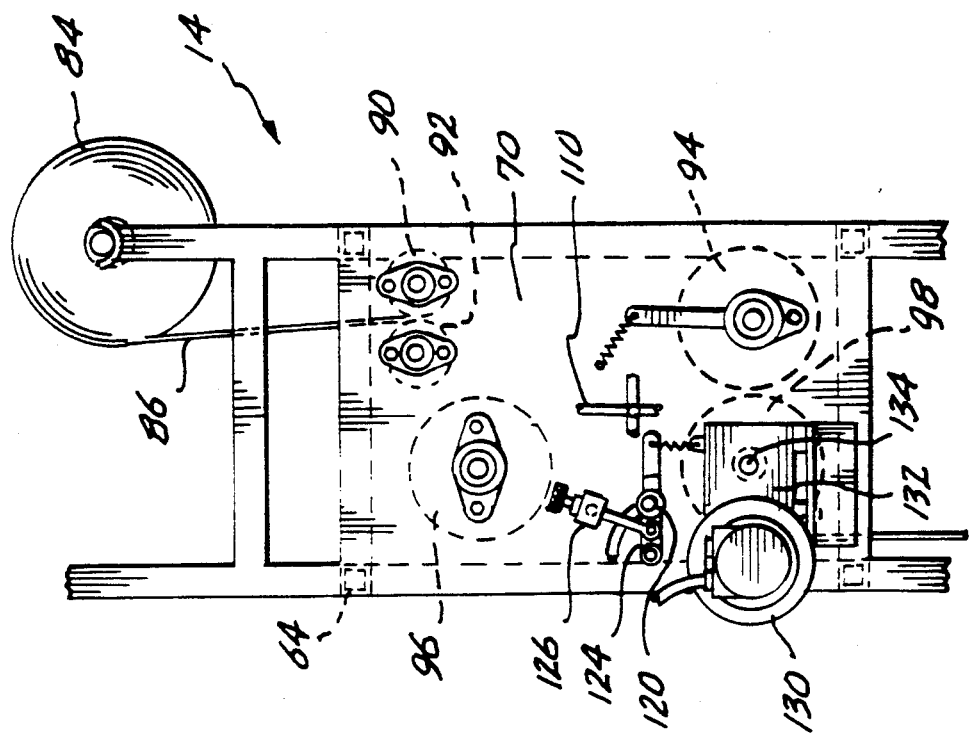
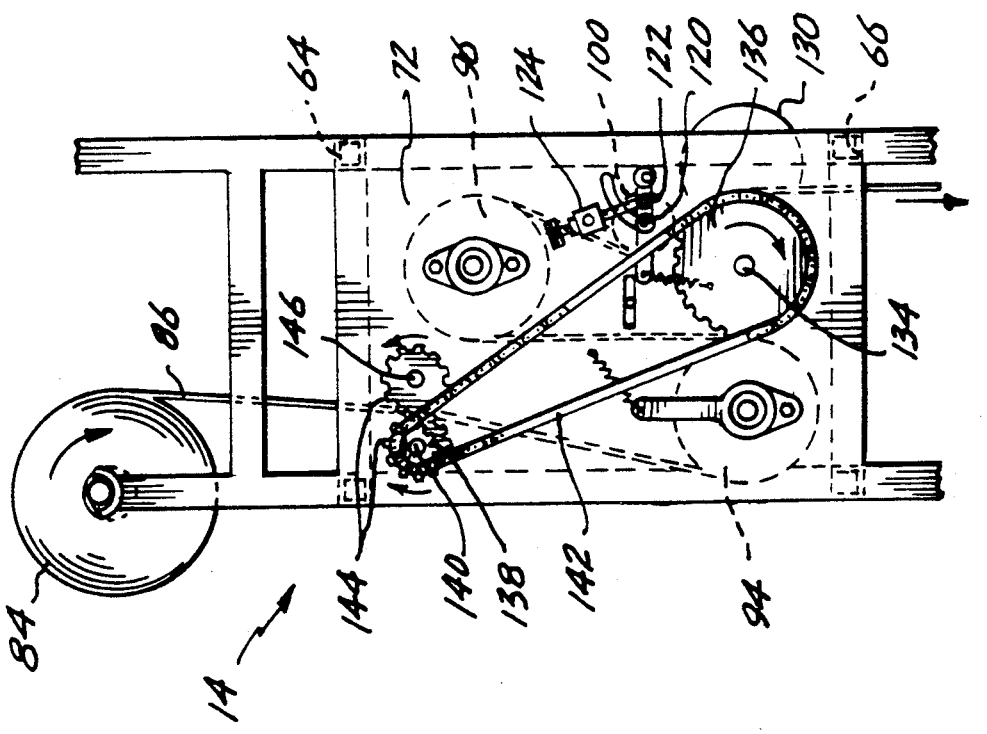

MULTIPLE ROLL IMPREGNATOR

TECHNICAL AREA

The present invention relates to a fiberglass and resin-applicating apparatus, and more particularly to an apparatus for impregnating a fabric with a resin.

BACKGROUND OF THE INVENTION

Fiberglass fabrics woven or nonwoven, are impregnated with a resin, such as a polyester resin, and therafter laid on a mold. During the impregnation process, resin is applied to the fabric. Prior art impregnators apply the resin to the fabric in an amount in excess of that which the fabric will absorb. The fabric is then run between a pair of nip rolls to squeeze excess resin. During this process, air is trapped in the fabric. The trapped air must be rolled out by finned rolls or removed with squeegees after the fabric is laid onto a mold, a very laborious job.

SUMMARY OF THE INVENTION

The present invention provides an apparatus for impregnating a strip of woven or nonwoven fabric with a viscous liquid such as a polyester resin, in a manner that virtually eliminates the possibility of entrapping air in the fabric. The apparatus includes a means for holding a roll of fabric and a first roll means for receiving the fabric from the roll. Normally, the first roll means (preferably a pair of rolls) is employed to pull the fabric from the roll and meter the speed at which the fabric is fed to a second roll. The second roll receives the fabric from the first roll means. A third roll positioned above the second roll receives fabric from the second roll after the fabric is wrapped partway around the second roll. A fourth roll positioned beside the second roll and below the third roll receives the fabric from the third roll after the fabric is wrapped partway around the third roll. The second and fourth rolls intimately engage opposite sides of the fabric. After the fabric leaves the fourth roll, it travels between a fifth roll and the fourth roll. The fifth roll is positioned on the top side of the fourth roll opposite from the second roll. Means are provided for rotating at least the first roll means and the fourth roll. Means are also provided for introducing a viscous liquid into the space between the fabric and the fourth roll so that the liquid is applied to only one side of the fabric as it travels upwardly from the second roll toward the third roll. Excess liquid is applied to the one side of the fabric. That liquid is pressed with a radial force into and through the fabric as the fabric passes over the third roll. Excess resin is then squeezed from the fabric as it travels between the fifth and fourth rolls. In this manner, the fabric is impregnated with resin and is virtually free of entrapped air, primarily because the liquid is applied to the fabric from only one side and forced through the fabric by the third roll.

BRIEF DESCRIPTION OF THE DRAWINGS

A better understanding of the present invention can be derived by reading the ensuing specification in conjunction with the accompanying drawings wherein:

FIG. 4 is a left side elevation view of the apparatus shown in FIG. 2;

FIG. 5 is a right side elevation view of the impregnator shown in FIG. 2;

DESCRIPTION OF THE PREFERRED EMBODIMENT

Figure 1:
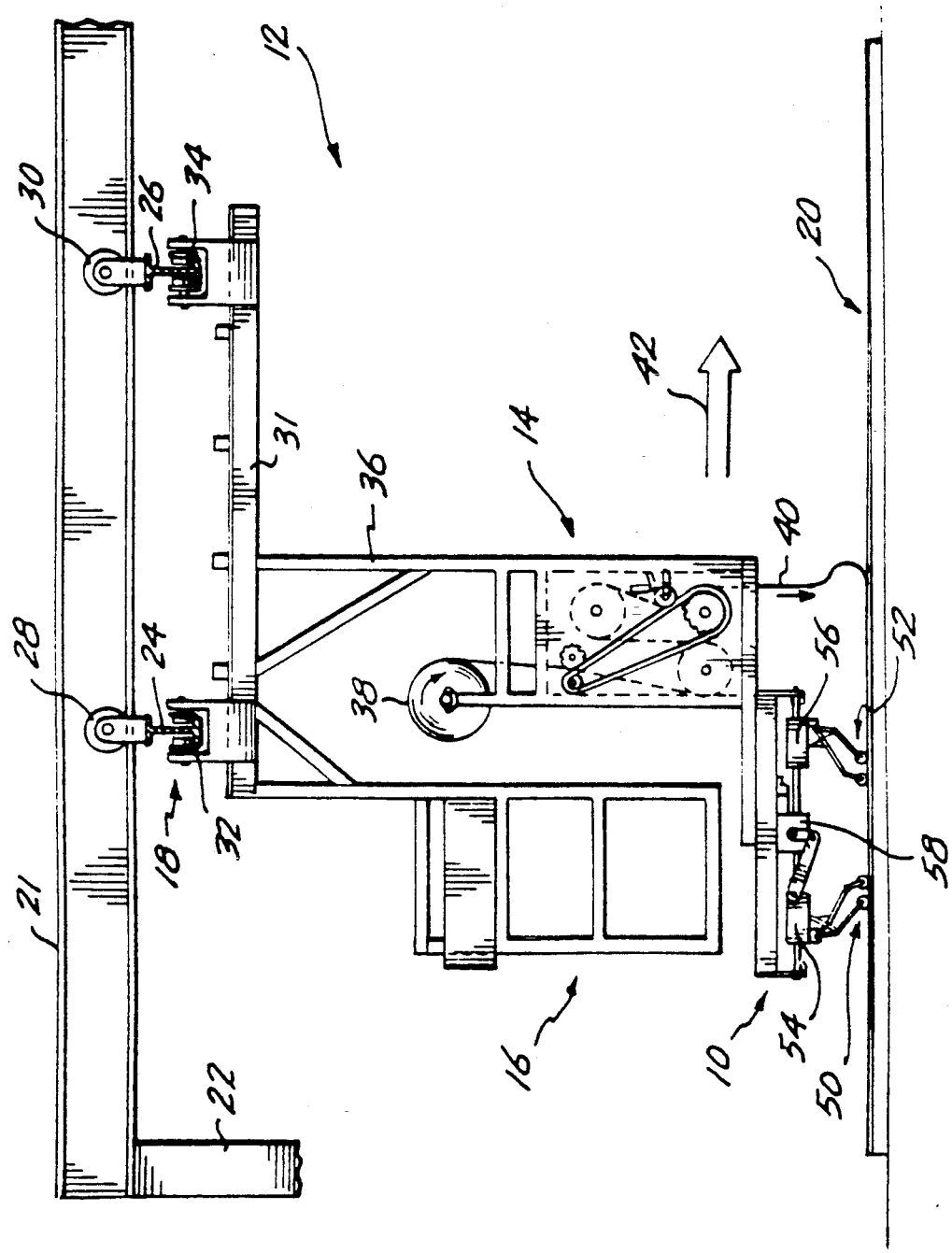
FIG. 1 is a side elevation view of a six roll impregnator and a rollout apparatus forming part of a fiberglass resin lay-down system.

Referring first to FIG. 1, the rollout apparatus constructed in accordance with the present invention, generally designated 10, is illustrated connected to a fiberglass mat impregnating and lay-down assembly generally designated 12. The assembly 12 includes the rollout apparatus, an impregnator 14, an operator's stand 16, and an overhead crane assembly, generally designated 18, for translating the impregnator and rollout device in two directions so that successive lengths of impregnated mat can be laid laterally across a mold 20. The overhead crane assembly 18 is constructed in a conventional manner and includes a pair of longitudinal rails (only one of which, 21, can be seen in FIG. 1) supported by framework 22 only partially shown. A pair of I-beams 24 and 26 depend from two sets of trucks (only one set of which, 28 and 30, can be seen in FIG. 1) riding on the longitudinal rails. The support frame 31 for the impregnator and rollout device is suspended from two sets of trucks (only one set of which, 32 and 34, can be seen in FIG. 1). These trucks ride on the upper surface of the lower cross member of the I-beams 24 and 26.

The impregnator 14 is suspended below the support frame 31 by appropriate depending structure 36. The impregnator carries a roll 38 of fiberglass web, mat, roving, or other woven or nonwoven fabric, which is impregnated with polyester resin or other suitable resin by the impregnator 14. A sheet of resin impregnated mat 40 drops from the impregnator 14 and engages the upper surface of the mold 20 as the assembly 12 is translated in the direction of arrow 42 along the entire length of the mold 20. A rollout apparatus 10 carries sets of rollers 50 and 52 that are mounted on oscillating carriages 54 and 56. A drive assembly 58 is provided to reciprocate the carriages 54 and 56 in an opposite direction to cause the rollers to traverse the impregnated mat in opposite directions as the assembly 12 traverses the length of the mold 20. In this manner, the impregnated mat is properly consolidated against the mold. When the assembly 12 reaches the end of the mold, a mechanism is provided to retract the rollers 52 upwardly from the mold. The glass mat is severed and the assembly is rotated or returned to the other end of the mold, indexed transversely across the mold, and a second mat is laid down and rolled out by the rollout apparatus 10 of the present invention. This procedure is repeated until the laminate is completed.

While the present invention has been described in relation to laying down successive lengths of fiberglass fabric across a flat mold, it is to be understood that a variety of mold shapes can be employed successfully with the present invention. For example, with a modification to the mounting assembly for the impregnator and rollout apparatus so that it can also be moved vertically, the apparatus of the present invention can be utilized to lay successive lengths of impregnated fiberglass fabric across a curved mold such as a boat hull.

Figure 2:
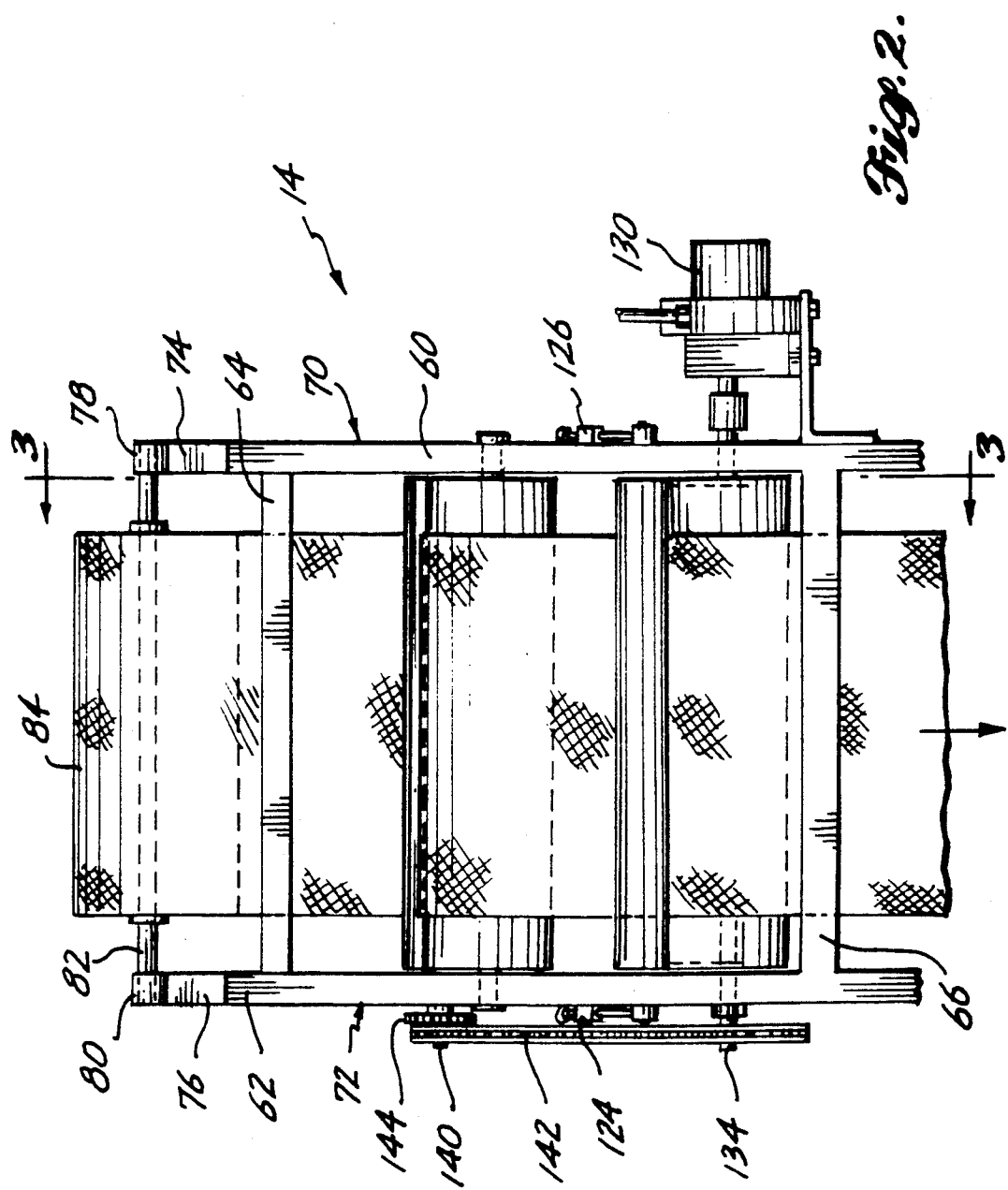
FIG. 2 is an enlarged front elevation view of the six roll impregnator constructed in accordance with the present invention.
Figure 3:
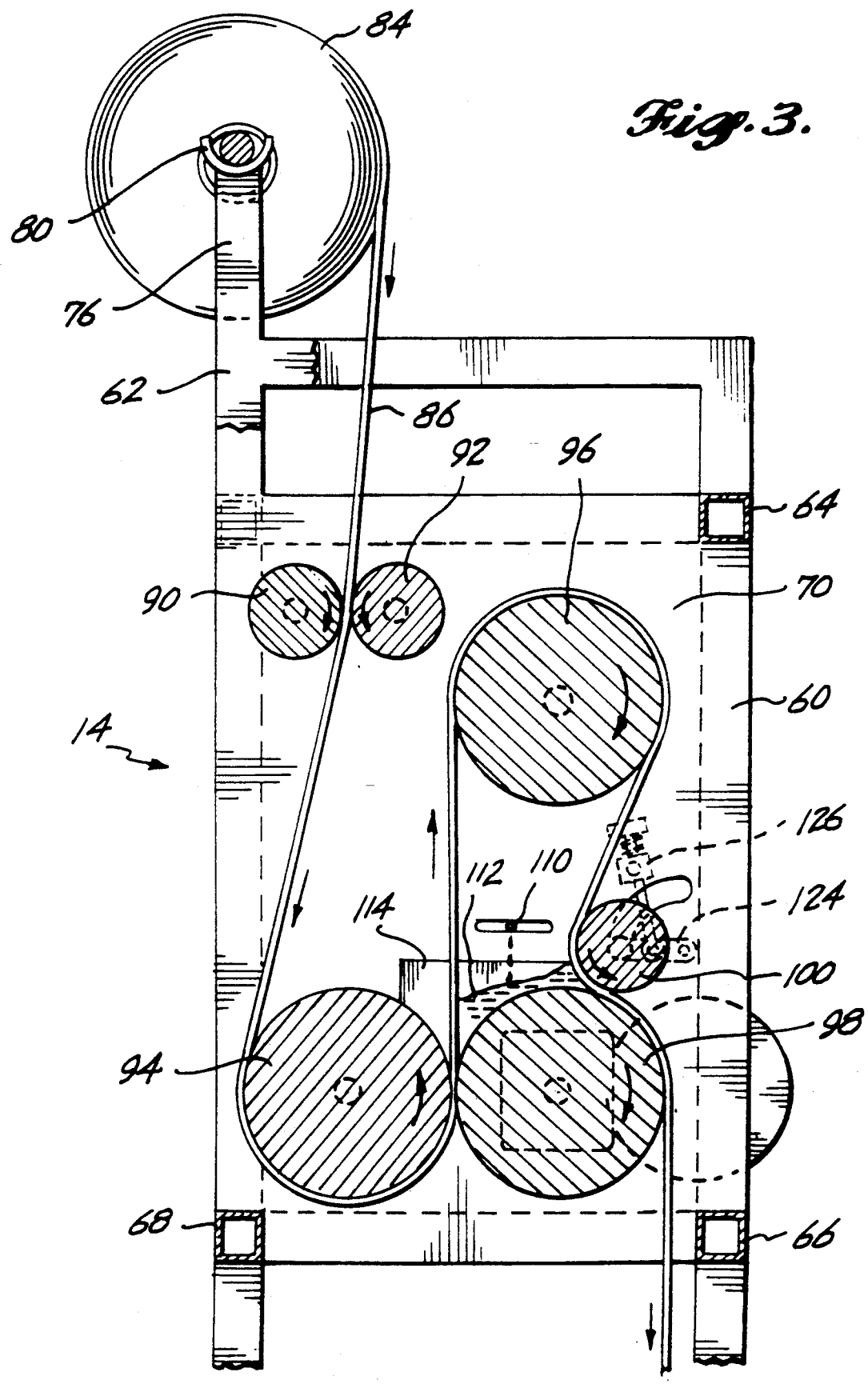
FIG. 3 is a partial cross-sectional view of the apparatus taken along a section line 3—3 of FIG. 2.

Referring now to FIGS. 2 and 3, the impregnator 14 includes a pair of box frames 60 and 62 on each side, joined by upper forward cross member 64, lower forward cross member 66, and lower rearward cross member 68. Side panels 70 and 72 are mounted on the outsides of the box frames 60 and 62. The bearings for all of the rollers in the impregnator are mounted on the side panels 70 and 72. A pair of uprights 74 and 76 extend upwardly from the upper end of the box frames. The uprights carry a pair of upwardly opening cradles 78 and 80. A roll 84 of fiberglass woven or unwoven fabric, is supported on a rod 82, which in turn rests in the cradles 80 and 78. In FIG. 3, a strip 86 of the fabric extends downwardly from the forward side of the roll 84 into a pair of nip rolls 90 and 92. The nip rolls are mounted in appropriate bearings on the side panels 70 and 72 at a location toward the upper rearward portion of the box frames 60 and 62. Nip rolls 90 and 92 serve to draw fabric from the roll 84 and control the descent of the fabric toward the first impregnator roll 94. The nip rolls 90 and 92 are mounted for rotation about horizontal axes that are parallel to each other. The surfaces of the nip rolls are composed of rubber or other high-friction material so that a good grip on the fabric is achieved. All of the remaining rolls in the apparatus are also mounted for rotation about horizontal axes that are parallel to each other.

The first impregnator roll 94 is larger than the nip rolls and is mounted near the bottom rearward portion of the box frames. The fabric strip 86 extends around the rearward side of the roll 94 and up the forward side in a substantially vertical direction. The strip 86 then extends around a pressure roll 96, which is mounted above and slightly forwardly of the first impregnator roll 94, such that the fabric strip running between the roll 94 and 96 is substantially vertically oriented. The fabric strip then runs over the top of the pressure roll 96, around the front of the roll and back down toward the upper central portion of a second impregnator roll 98, which is mounted immediately forwardly of the first impregnator roll 94. An idler roll 100 is mounted above and slightly forwardly of the axis of the second impregnator roll 98. Fabric strip 86 extends downwardly from the pressure roll 96, around the rearward side of the idler roll 100 and between the idler roll and the second impregnator roll 98. Thereafter the fabric strip drops downwardly from the forward side of the impregnator roll 98 and is laid on a mold.

Resin is supplied through a resin supply tube 110 extending through the right side panel 72 at a location above the impregnator roll 98, and between the first impregnator roll 94 and the idler roll 100. The resin is supplied to a pool 112 on the forward side of the fabric, which extends upwardly from the first impregnator roll 94 to the pressure roll 96. In this manner, resin is supplied to only one side of the fabric so that air is not trapped within the fabric as is the case with prior art impregnators where resin is supplied from both sides of the fabric. Excess resin is supplied so that a layer of resin is still present on the forward side of the fabric strip 86 as it begins to engage the pressure roll 96. This excess resin is pressed radially outwardly through the fabric as the fabric traverses over the top of the pressure roll 96. Sufficient resin has been applied so that as the fabric strip leaves the pressure roll 96, excess resin is now present in the strip 86 as it passes downwardly toward the idler roll 100. Excess resin is then pressed from the fabric as it passes between the impregnator roll 98 and the idler roll 100. The excess resin is returned to the resin pool 112 on top of the second impregnator roll 98. Conventional side dams 114 (only one of which is shown in FIG. 3) are provided on each side of the impregnator rolls 94 and 98 to prevent resin from dropping from the end of the rolls. These side dams are typically made of a material having a low coefficient of friction, such as nylon or high-density polyethylene.

Referring now to FIGS. 3 and 5, the shaft 120 of the idler roll 100 is mounted on a pair of horizontal arms 122 and 124. The arms extend forwardly from the shaft 120 and are mounted respectively to the side panels 72 and 70 via appropriate pivot pins. Conventional micrometer jackscrew adjusting mechanisms 124 and 126 are coupled between the central portions of the arms 122 and 124 and the side panels 70 and 72, allowing the arms to be selectively raised and lowered, thus raising and lowering the idler roll 100. In this manner, the distance of the surface of the idler roll 100 from the surface of the second impregnator roll 98 can be adjusted so that the exact amount of resin left in the fabric can be metered as desired.

Still referring TO FIGS. 3, 4 and 5, a pneumatically powered motor 130 is mounted on the left side of the impregnator. The motor powers a transmission 132, which in turn rotates the shaft 134 of the second impregnator roll 98. A sprocket 136 is attached to the opposite end of the shaft 134. A second sprocket 138 is affixed to the shaft 140 of the rearmost nip roll 90. An endless chain 142 couples the sprockets 136 and 138 so that the nip roll 90 is also driven. A pair of gears 144 are mounted respectively to the shafts 140 and 146 of the nip rolls 90 and 92 so that the nip rolls are simultaneously driven as well. The sprockets 136 and 138 and the gears 144 are sized such that the surface speeds of the nip rolls are matched to the surface speeds of the first impregnator roll 94. Rolls 94, 96 and 100 in the preferred embodiment are idlers, thus being driven by the fabric passing past the rolls.

Figure 6:
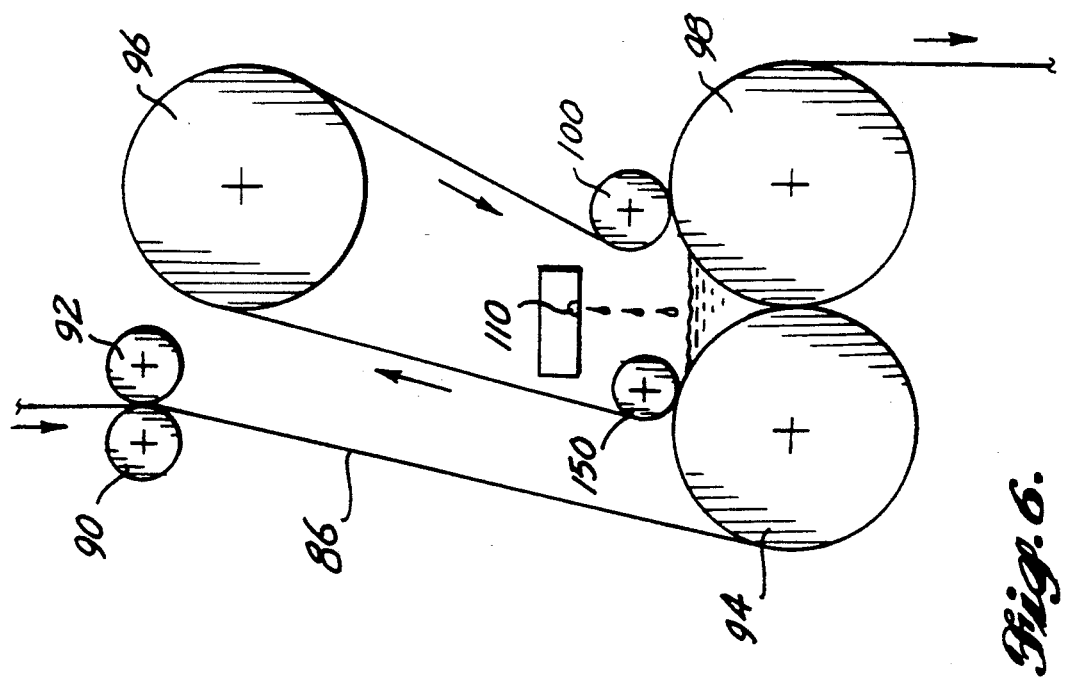
FIG. 6 is a schematic diagram of an alternate embodiment of the present invention employing seven rolls.

In some applications where heavier fabrics, or a plurality of fabric laminates are employed, additional rolls may be optionally employed to achieve better resin saturation in the fabric. Referring to FIG. 6, an optional seventh roll 150 is positioned above the first impregnator roll 94 and spaced away from the second impregnator roll 98. The seventh roll 150 presses the fabric against the first impregnator roll so that the fabric has a longer contact time with the puddle of resin between the first and second impregnator rolls. The fabric then extends upwardly from the seventh roll 150 to the pressure roll 96 and thence, as in the prior embodiments, to the idler 100 and second impregnator roll 98. Optionally, roll 150 can be finned to allow more resin to remain on the inside of the strip 86 as it traverses toward the pressure roll 96.

Figure 7:
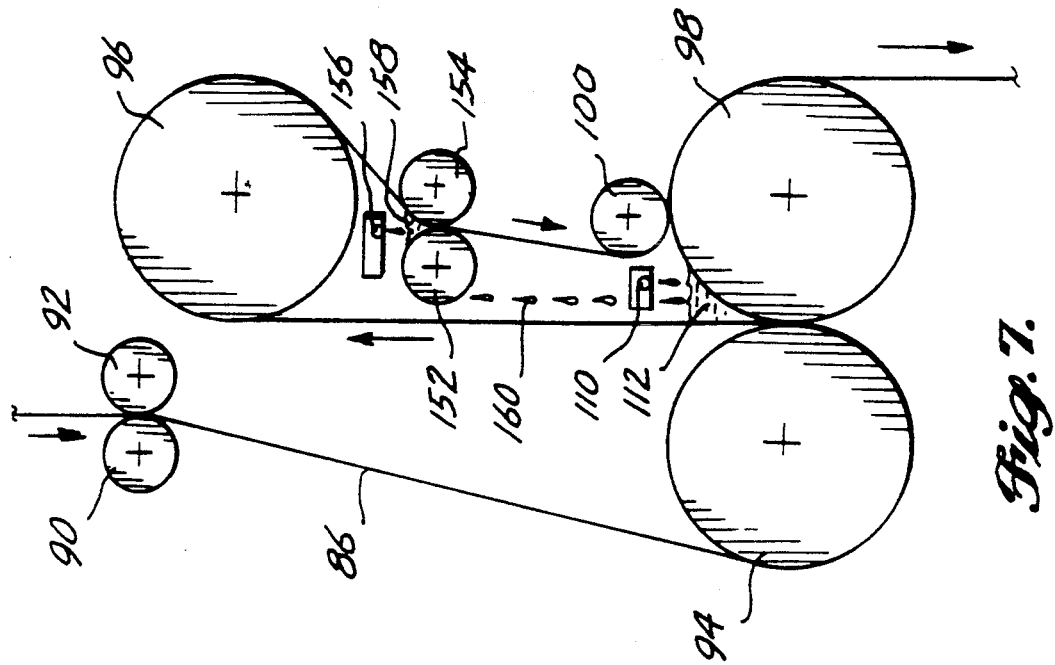
FIG. 7 is a schematic diagram of an alternate embodiment of the present invention employing eight rolls.

Referring to FIG. 7, an eight-roll option is illustrated. In this optional arrangement, a pair of pinch rolls 152 and 154 are positioned below the pressure roll 96 and above the idler 100 and second impregnator roll 98. Fabric leaving the pressure roll traverses between the pinch rolls 152 and 154 and thence to the idler roll 100.

Optionally, an additional resin input port 156 can be provided above pinch roll 152 so that a pool of resin 158 is formed between the fabric and the inside pinch roll 152, which is positioned between the fabric going toward and leaving the pressure roll 96. Excess resin 160 can drip over the inside of the inside pinch roll 152 and down into the original resin pool 112. Optionally, inside pinch roll 152 can be finned so that additional resin is allowed to accumulate on the inside surface of the fabric as it extends down toward idler roll 100.

Figure 8:
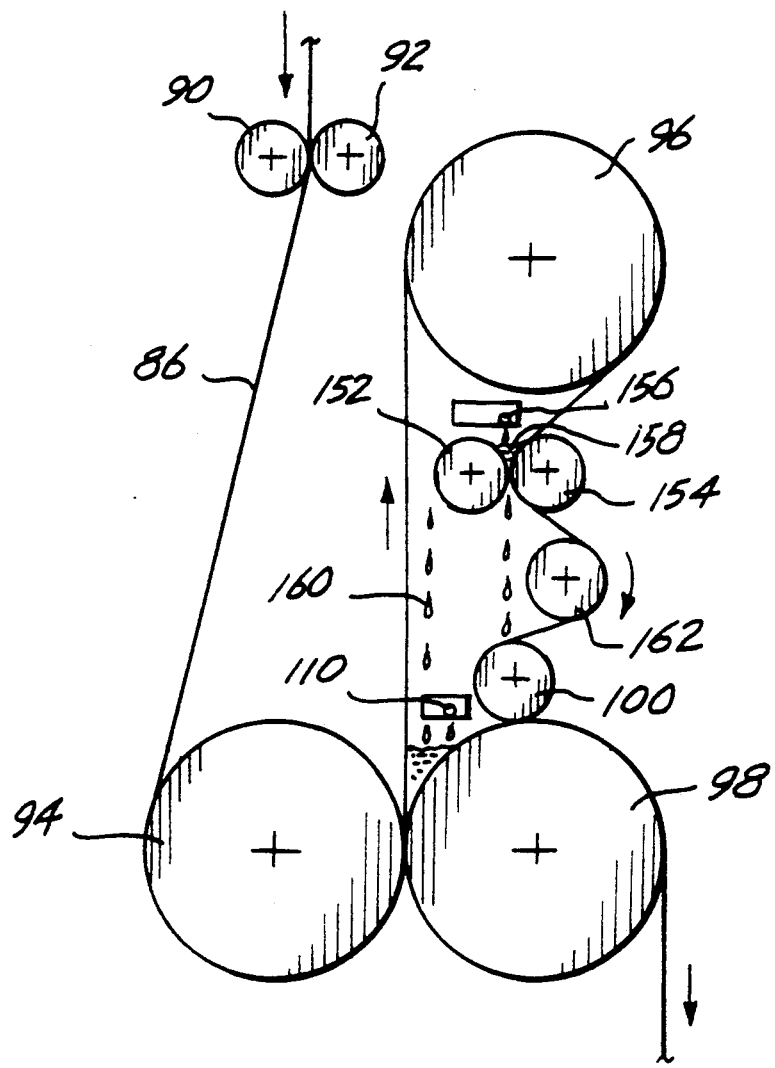
FIG. 8 is a schematic diagram of an alternate embodiment of the present invention employing nine rolls.

FIG. 8 illustrates a modification of the eight-roll system shown in FIG. 7. In this system, a ninth roll 162 is positioned between the pinch rolls 152 and 154 and the idler roll 100. The ninth roll 162 is positioned on the inside of the fabric, that is, between the fabric extending from the impregnator rolls 94 and 98 toward the pressure roll 96 and the fabric leaving the pinch rolls 152 and 154 and extending toward the idler roll 100. The ninth roll 162, however, is offset outwardly so that the fabric traverses approximately 160° around ninth roll 162. The ninth roll causes additional flexure of the fiber and opens up the interstices between the fibers to cause better penetration of the resin into a heavy fabric or fabric laminate. If desired, the seventh, eighth, and ninth rolls can be driven to assure that they will turn as the fabric traverses them.

The present invention has been described in relation to a preferred embodiment. One of ordinary skill will be able to effect various changes, substitutions of equivalents, and other alterations without departing from the broad concepts disclosed herein. For example, the exact placement and orientation of the rolls can be changed at will as long as the integrity of the resin pool and the resin is applied to only one side of the fabric as it traverses from the impregnator rolls to the pressure roll occurs. It is therefore intended that the Letters Patent issuing hereon be limited only by the definition of the appended claims and equivalents thereof.

The embodiments of the invention in which an exclusive property or privilege is claimed are defined as follows:

1. An apparatus for impregnating a strip of woven or nonwoven fabric with viscous liquid comprising:
   means for holding a roll of said fabric;
   first roll means for receiving said fabric from said roll;
   a second roll for receiving said fabric from said first roll means;
   a third roll positioned above said second roll to receive fabric from said second roll after the fabric has wrapped part way around said second roll;
   a fourth roll positioned beside said second roll and below said third roll for receiving fabric from said third roll after the fabric has wrapped part way around said third roll, said fourth roll and said second roll intimately engaging said fabric as it extends between said fourth and second rolls;
   a fifth roll, positioned above said second roll and said fourth roll, for holding said fabric between said fourth roll and said fifth roll, the fabric thereafter leaving said fourth roll on the side opposite from said second roll;
   means for rotating at least said first roll means and said fourth roll;
   means for introducing said viscous liquid into the space between the fabric and the fourth roll so that the fabric picks up liquid as it travels upwardly from said second roll towards said third roll, wherein said viscous fluid is forced into said fabric as said fabric passes over said third roll, and said fifth roll is positioned relative to said fourth roll to squeeze excess viscous liquid from said fabric, said excess viscous liquid flowing over said fourth roll to return to the space between said fabric and said fourth roll;
   sixth and seventh rolls positioned below said third roll and above said fourth and fifth rolls for receiving fabric from said third roll, said sixth and seventh rolls engaging the fabric therebetween, said sixth roll being positioned between the fabric extending toward said third roll and the fabric extending away from said third roll; and
   means for introducing a viscous liquid between said fabric and said sixth roll, the sixth and seventh rolls being positioned such that excess viscous liquid from between said fabric and said sixth roll flows into the space between said fabric and said fourth roll.

2. The apparatus of claim 1, further comprising:
   an eighth roll positioned between said seventh roll and above said fifth roll and being offset therefrom so that the fabric extending from said sixth and seventh roll toward said fifth roll extends around said eighth roll, said eighth roll being located between said fabric extending from said second roll to said third roll and the fabric extending from said sixth and seventh rolls to said fifth roll.

3. The apparatus of claim 1, wherein said sixth roll is finned.

4. The apparatus of claim 2, wherein said sixth roll is finned.

5. The apparatus of claim 2, wherein said eighth roll is driven.

* * * * *